United States Patent
Cao et al.

(10) Patent No.: US 12,472,976 B2
(45) Date of Patent: Nov. 18, 2025

(54) MULTI-LEVEL OPTIMIZATION FRAMEWORK FOR BEHAVIOR PREDICTION IN AUTONOMOUS DRIVING

(71) Applicant: Apollo Autonomous Driving USA LLC, Sunnyvale, CA (US)

(72) Inventors: Yu Cao, Sunnyvale, CA (US); Ang Li, Sunnyvale, CA (US)

(73) Assignee: APOLLO AUTONOMOUS DRIVING USA LLC, Sunnyvale, CA (US)

( * ) Notice: Subject to any disclaimer, the term of this patent is extended or adjusted under 35 U.S.C. 154(b) by 358 days.

(21) Appl. No.: 18/145,344

(22) Filed: Dec. 22, 2022

(65) Prior Publication Data

US 2024/0208533 A1 Jun. 27, 2024

(51) Int. Cl.
- *B60W 60/00* (2020.01)
- *B60W 30/09* (2012.01)
- *B60W 40/00* (2006.01)
- *G06N 5/022* (2023.01)

(52) U.S. Cl.
CPC .......... *B60W 60/001* (2020.02); *B60W 30/09* (2013.01); *B60W 40/00* (2013.01); *G06N 5/022* (2013.01); *B60W 2554/404* (2020.02)

(58) Field of Classification Search
CPC .... B60W 60/001; B60W 30/09; B60W 40/00; B60W 2554/404; G06N 5/022
USPC .......................................................... 701/27
See application file for complete search history.

(56) References Cited

U.S. PATENT DOCUMENTS

| | | | |
|---|---|---|---|
| 2023/0091239 A1* | 3/2023 | Goldman-Shenhar | G06N 7/01 701/27 |
| 2023/0222332 A1* | 7/2023 | Mahendran | G06N 3/045 706/25 |

OTHER PUBLICATIONS

Will Koehrsen, "Automated Machine Learning Hyperparameter Tuning in Python," Jul. 3, 2018, TDS Archive, whole document. (Year: 2018).*

* cited by examiner

*Primary Examiner* — Tiffany P Young
(74) *Attorney, Agent, or Firm* — WOMBLE BOND DICKINSON (US) LLP

(57) ABSTRACT

A system generates a first variant of a first machine learning (ML) model, the first variant associated with an initial hyperparameter value. The system determines a prediction metric for the first variant of the first ML model, the prediction metric indicating an accuracy of the behavior prediction. The system generates an estimated simulation metric for the first variant of the first ML model by applying a second ML model to the prediction metric. The system identifies a first hyperparameter associated with a second variant of the first ML model, the second variant of the first ML model having a corresponding prediction metric and a corresponding estimated simulation metric that meet a first predetermined criteria, the second variant of the first ML model is used by an autonomous driving vehicle (ADV) for behavior prediction.

20 Claims, 15 Drawing Sheets

MULTI-LEVEL OPTIMIZATION FRAMEWORK FOR BEHAVIOR PREDICTION IN AUTONOMOUS DRIVING

TECHNICAL FIELD

Embodiments of the present disclosure relate generally to operating autonomous driving vehicles. More particularly, embodiments of the disclosure relate to multi-level optimization framework for behavior prediction in autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Obstacle prediction is a critical operation in autonomous driving. Obstacle prediction includes predicting an intention and a trajectory of obstacles of an ADV. Obstacle prediction can affect control and planning for the ADV. For example, a planning module of the ADV can plan a driving trajectory for the ADV to avoid predicted paths of the obstacles.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
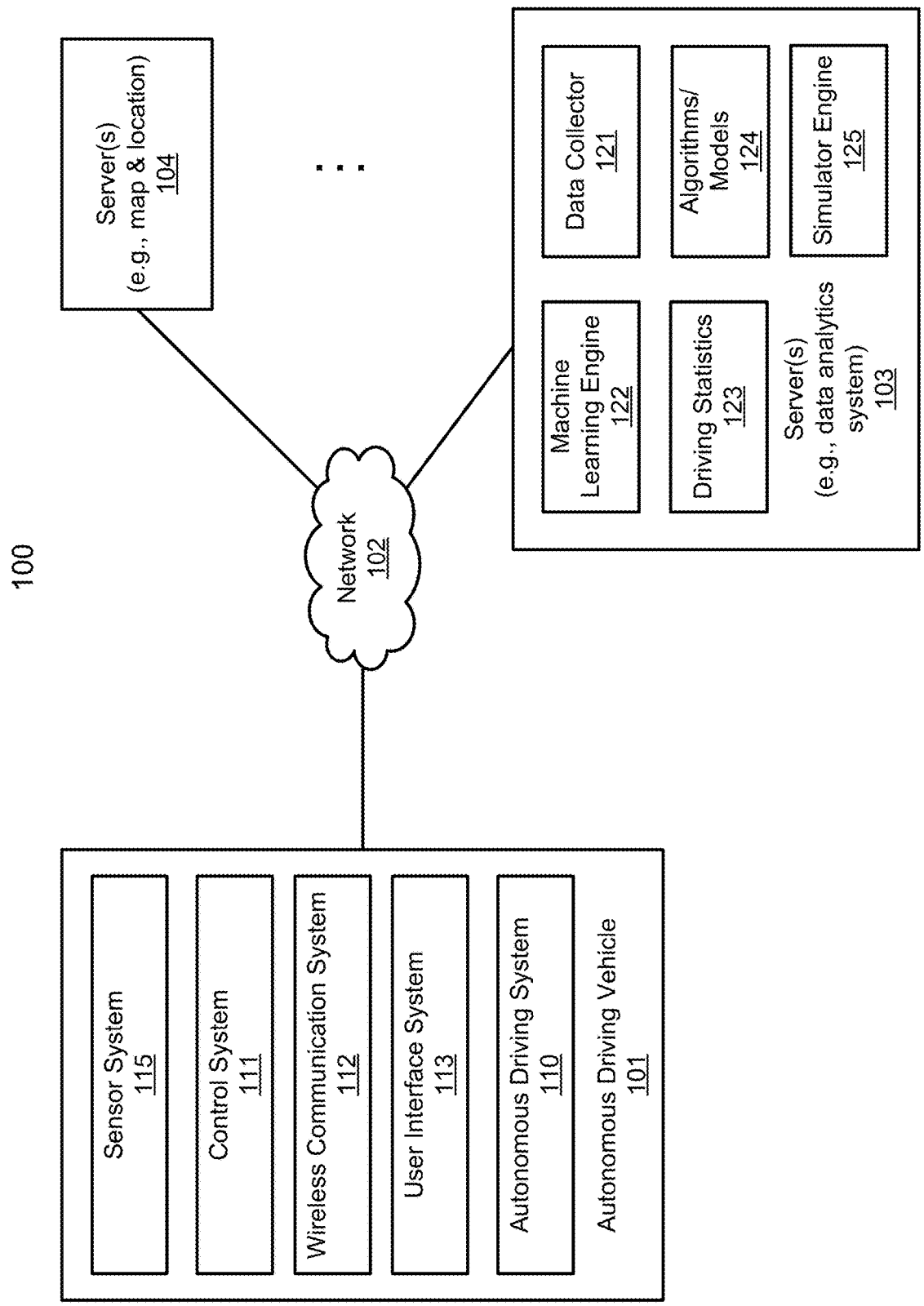
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a multi-level hyperparameter optimization framework is disclosed to fine tune hyperparameters for a machine learning (ML) model. The ML model can be used for obstacles behavior prediction for autonomous driving.

A ML model for behavior prediction can include two types of parameters being hyperparameters and model parameters. Model parameters are weights/biases in the ML model and are trained/learned during model training. Hyperparameters are the parameters of the ML model which can be arbitrarily set by a user before the start of the model training. Some examples of hyperparameters include: learning rate, number of layers in a deep neural network (DNN) model, number of neurons in a layer, the types of activation functions, number of epochs, batch size, type of optimizer, etc. The type of optimizer can include gradient descent, or variants thereof, such as stochastic gradient descent, mini-batch gradient descent, etc., momentum estimation, AdaDelta, adaptive moment estimation (Adam), etc.

Learning rate controls the rate or speed at which the model learns. Specifically, learning rate controls the amount of apportioned error that the weights/biases of the model are updated each time they are to be updated, such as, at the end of each training batch. The batch size refers to the number of samples to be processed before the weights of the ML model is updated. The number of epochs is the number of complete passes through the training dataset. The types of activation functions can include binary step function, linear function, sigmoid, tan h, rectified linear unit (ReLU), leaky ReLU, parameterized ReLU, exponential linear unit, etc. Each of the above can be tuned by hyperparameter optimization.

Hyperparameter optimization or hyperparameter tuning refers to the task of adjusting the values of hyperparameters to maximize the performance of the ML model. Optimizing hyperparameters can improve the performance of the machine learning model because the output of the ML model varies depending on what value a hyperparameter is set to. Conventional hyperparameter tuning optimizes a ML model using training/validation losses.

Accordingly, the present disclosure addresses the above-noted and other deficiencies by disclosing an automatic multi-level hyperparameter optimization approach to optimize hyperparameters for a ML model for obstacle prediction in autonomous driving. The hyperparameters of the ML model can be further optimized using driving performance metrics from simulations and/or road-tests to include downstream modules (e.g., control and planning) of an autonomous driving vehicle (ADV).

According to a first aspect, a system generates a first variant of a first machine learning (ML) model, the first variant associated with an initial hyperparameter value and variants of the first ML model are being used to predict a behavior of an obstacle of an autonomous driving vehicle (ADV). The system determines a prediction metric for the first variant of the first ML model, the prediction metric indicating an accuracy of the behavior prediction for the first variant of the first ML model. The system generates an estimated simulation metric for the first variant of the first ML model by applying a second ML model to the prediction metric corresponding to the first variant of the first ML model. The system identifies a first hyperparameter associated with a second variant of the first ML model, the second variant of the first ML model having a corresponding prediction metric and a corresponding estimated simulation metric that meet a first predetermined criteria. The second variant of the first ML model is used by an autonomous driving vehicle (ADV) to predict a behavior of an obstacle.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
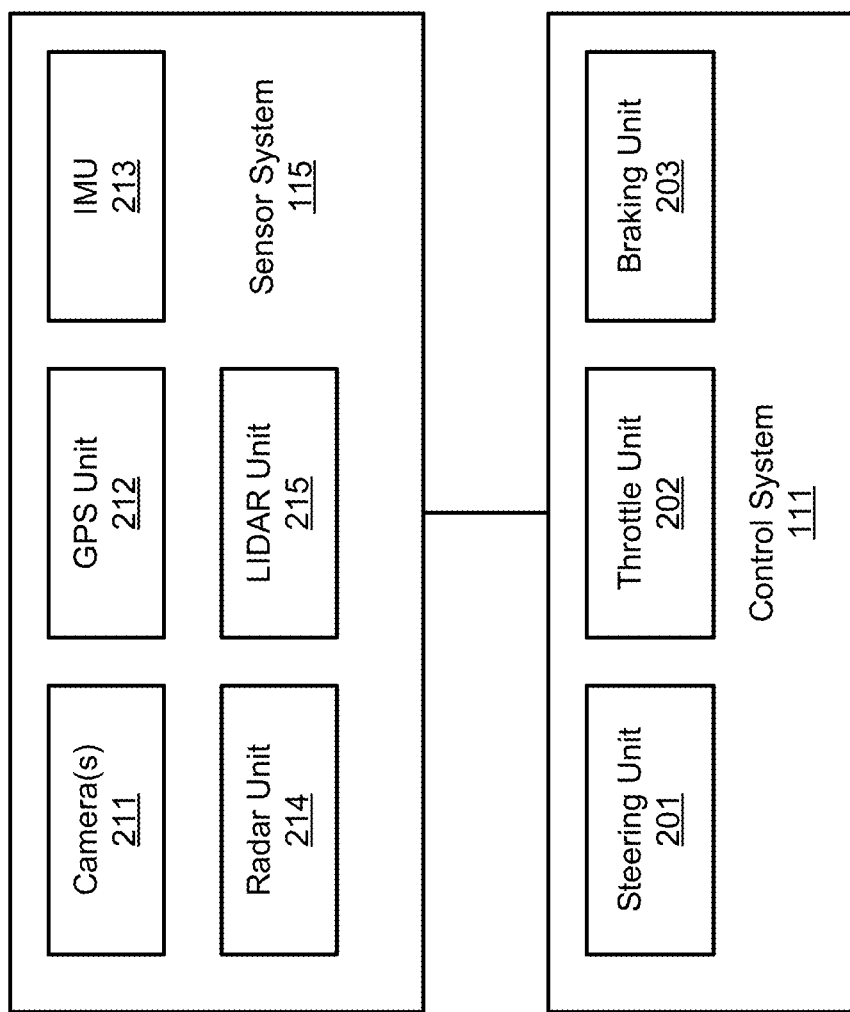
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a machine learning (ML) model for obstacle prediction. The ML model for obstacle prediction can include a deep neural network (NN) model. In one embodiment, the deep NN model can be a graph NN.

Algorithms 124 can then be uploaded on ADVs to be utilized during autonomous driving in real-time.

In some embodiments, algorithms 124 include a ML model to estimate simulation metrics for the obstacle prediction ML model and a ML model to estimate road-test metrics for the obstacle prediction ML model. The ML models to estimate simulation/road-test metrics can be a linear regression (LR) model trained by supervised learning. For example, the LR models can be trained using previously simulation/road-test metrics, respectively. In one embodiment, the LR models are constrained LR models where the input and/or output metric values are constrained to be non-zero.

Figure 3A:
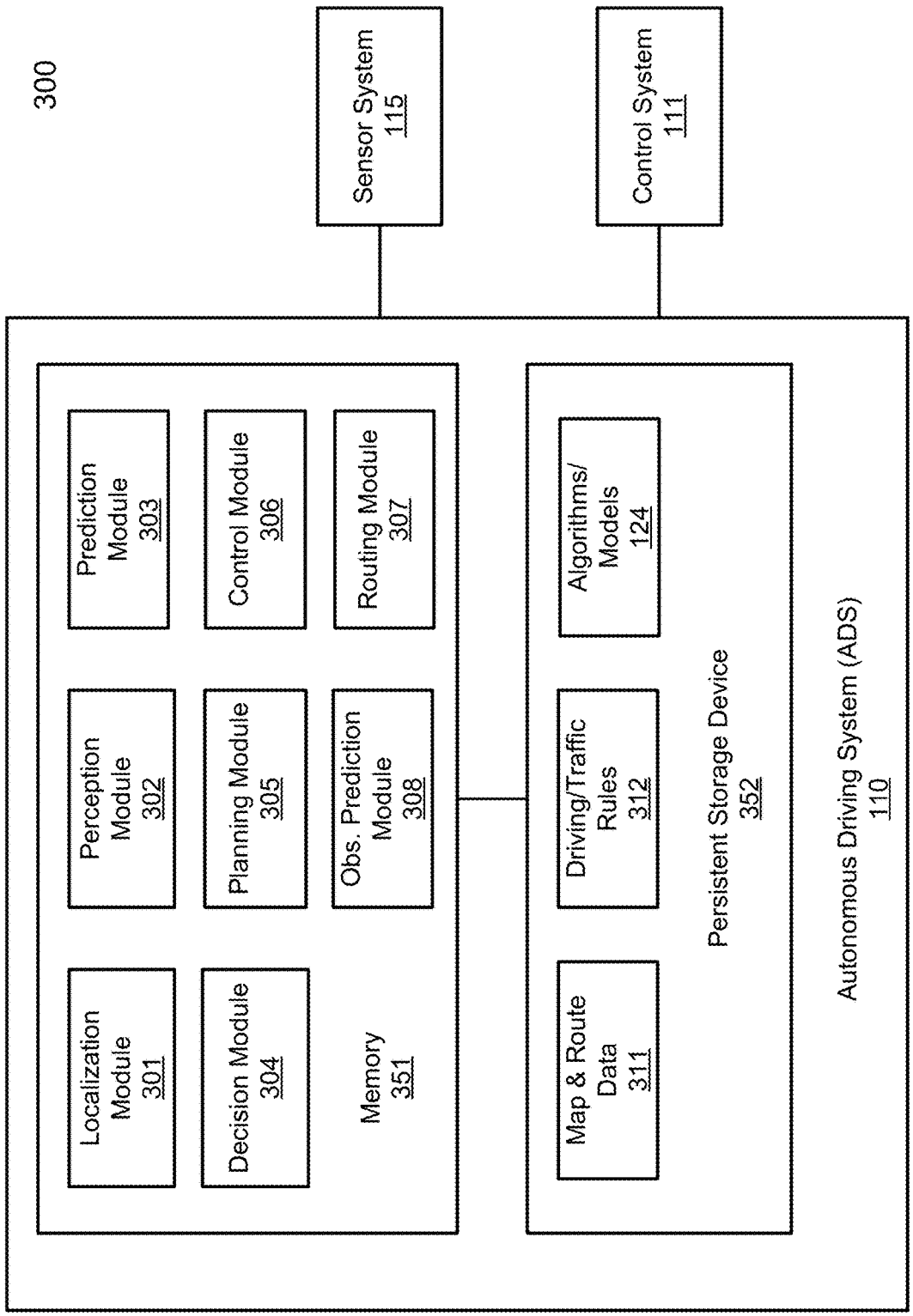
FIGS. 3A-3B are block diagrams illustrating an example of an autonomous driving system used with an autonomous driving vehicle according to one embodiment.
Figure 3B:
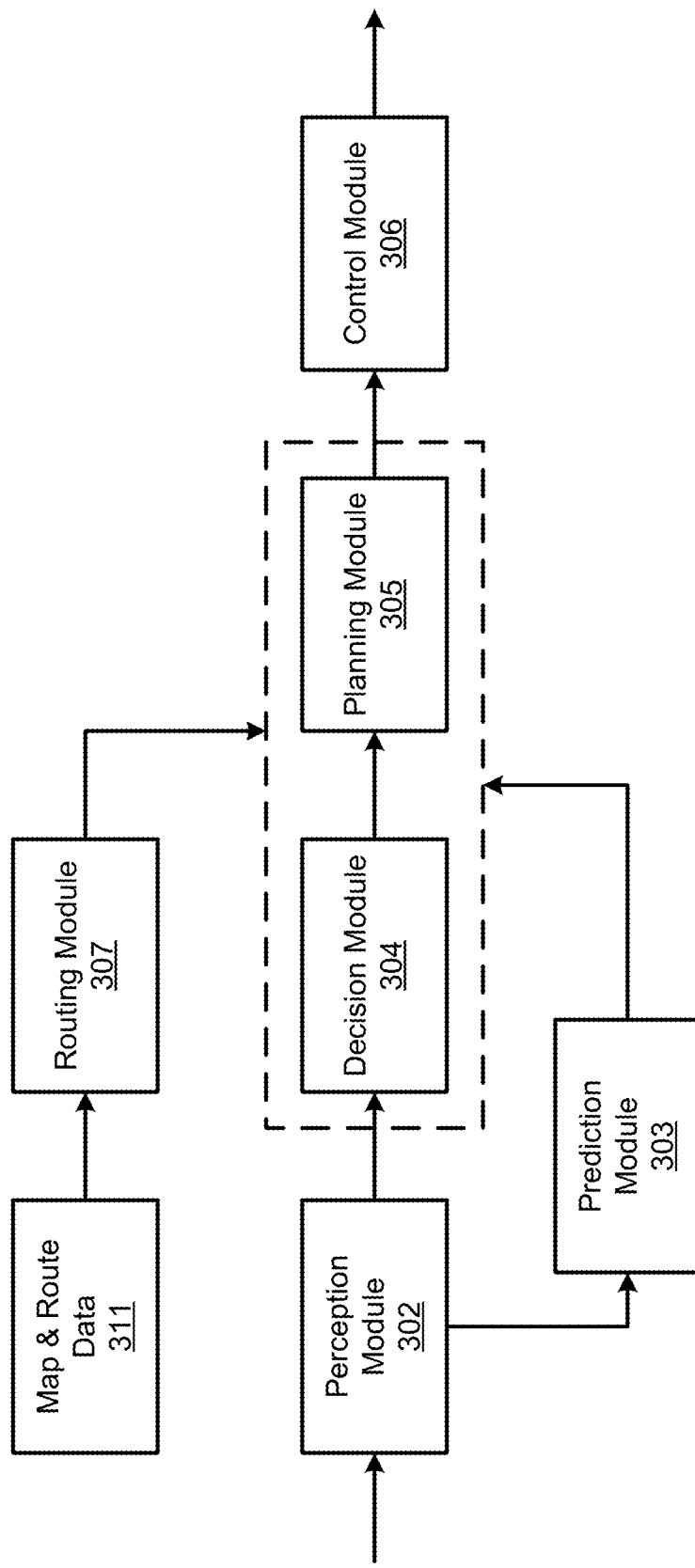

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, obstacle prediction module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 101, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 101 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
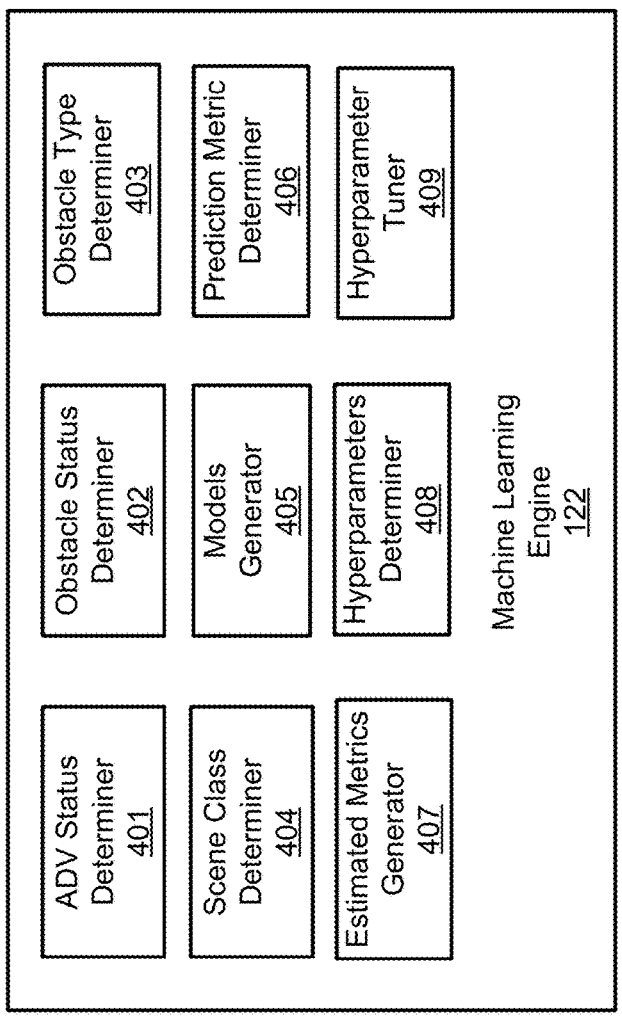
FIG. 4 is a block diagram illustrating an example of a machine learning engine according to one embodiment.

FIG. 4 is a block diagram illustrating an example of a machine learning engine 122 according to one embodiment. Machine learning (ML) engine 122 can optimize hyperparameters for a ML model for obstacle prediction. In one embodiment, ML engine 122 can include submodules such as ADV status determiner 401, obstacle status determiner 402, obstacle type determiner 403, scene class determiner 404, models generator 405, prediction metric determiner 406, estimated metrics generator 407, hyperparameter determiner 408, and hyperparameter tuner 409. ADV status determiner 401 can determine status information for an ADV. The status information can be used to classify the obstacle prediction scene into one of a plurality of classes. The status information can describe a driving status of ADV 101. In one embodiment, status information for ADV 101 includes: ADV entering a roundabout, ADV exiting a roundabout, ADV detouring around an obstacle, or others.

Obstacle status determiner 402 can determine status information for an obstacle. Status information to an obstacle can be similar to the status information for the ADV, where the obstacle is treated as a moving object. In one embodiment, status information for obstacles includes: obstacle entering a roundabout, obstacle exiting a roundabout, obstacle detouring around another obstacle, or others.

Obstacle type determiner 403 can determine an obstacle type of the obstacle for obstacle prediction. For example, the obstacle types can be: vehicles, bicycles, pedestrians, others. Scene class determiner 404 can determine a scene classification for the obstacle prediction. The classification is used by a ML model to estimate performance metrics according to the scene. For example, an obstacle can be categorized into one of $4^3=64$ categories using information from status information of the ADV, status information of the obstacle, and the obstacle type as further described in FIGS. 12A-12B. A ML model then receive input metrics (such as prediction metrics or simulation metrics) according to the classification and output estimations of performance metrics (such as estimated simulation metric or estimated road-test metric).

Models generator 405 can generate variations of the obstacle prediction ML model using different hyperparameters. The variations are optimized ML models according to model training losses. Prediction metric determiner 406 can determine the prediction metric for an obstacle prediction ML model. Estimated metrics generator 407 can generate estimated simulation/road-test metrics using a ML model such as a constrained linear ML model. Hyperparameter determiner 408 can determine different hyperparameters using different search algorithms, such as random search, grid search, etc. Hyperparameter tuner 409 can tune the hyperparameters of the obstacle prediction ML model to meet a particular criteria. An example criteria is selecting the hyperparameter with the best estimated performance metrics among hyperparameters in a hyperparameter search space. Note that some of modules 401-409 may be integrated together as an integrated module.

Figure 5:
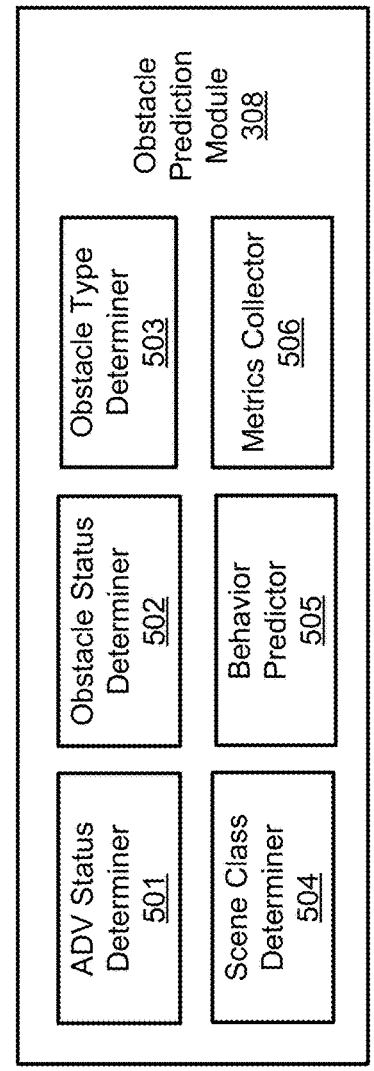
FIG. 5 is a block diagram illustrating an example of an obstacle prediction module according to one embodiment.

FIG. 5 is a block diagram illustrating an example of an obstacle prediction module 308 according to one embodiment. Obstacle prediction module 308 can apply, when ADV 101 is driving on the road (e.g., online and in real-time), an obstacle prediction ML model to obstacles to determine an intent and an obstacle trajectory for the obstacle. The intent of an obstacle can be: stay in lane, move left, move right, go straight, etc. The obstacle trajectory can include a planning speed/path prediction for the obstacle. In one embodiment, obstacle prediction module 308 includes submodules such as ADV status determiner 501, obstacle status determiner 502, obstacle type determiner 503, scene class determiner 504, behavior predictor 505, and metrics collector 506. ADV status determiner 501, obstacle status determiner 502, obstacle type determiner 503, and scene class determiner 504 can be similar to respective ADV status determiner 401, obstacle status determiner 402, obstacle type determiner 403, scene class determiner 404 of FIG. 4, except modules 501-504 can be used by the ADV in real-time autonomous driving. Behavior predictor 505 can apply a ML model to obstacles for obstacle prediction. Metrics collector 506 can collect performance (e.g., road-test) metrics for the ADV. For example, performance metrics can include a quantity of hard brakes applied by the ADV over a predetermined distance (e.g., 1000 km), a quantity of collisions over the predetermined distance, and a quantity of interventions by an operator of the ADV over the predetermined distance. Typically, an operator intervenes the autonomous driving system of the ADV when the operator believes the autonomous planning and/or decisions making are unusual. Thus, the performance metrics can quantify how well the obstacle prediction model performs on the road. Note that some of modules 501-506 may be integrated together as an integrated module.

As previously described, a multi-level hyperparameter optimization approach is disclosed to optimize hyperparameters for a ML model for obstacle prediction. In one embodiment, the multi-level optimization framework can include optimization at a training level, a validation level, a simulation level, and/or a road-test level, as further described in FIGS. 6-9.

Figure 6:
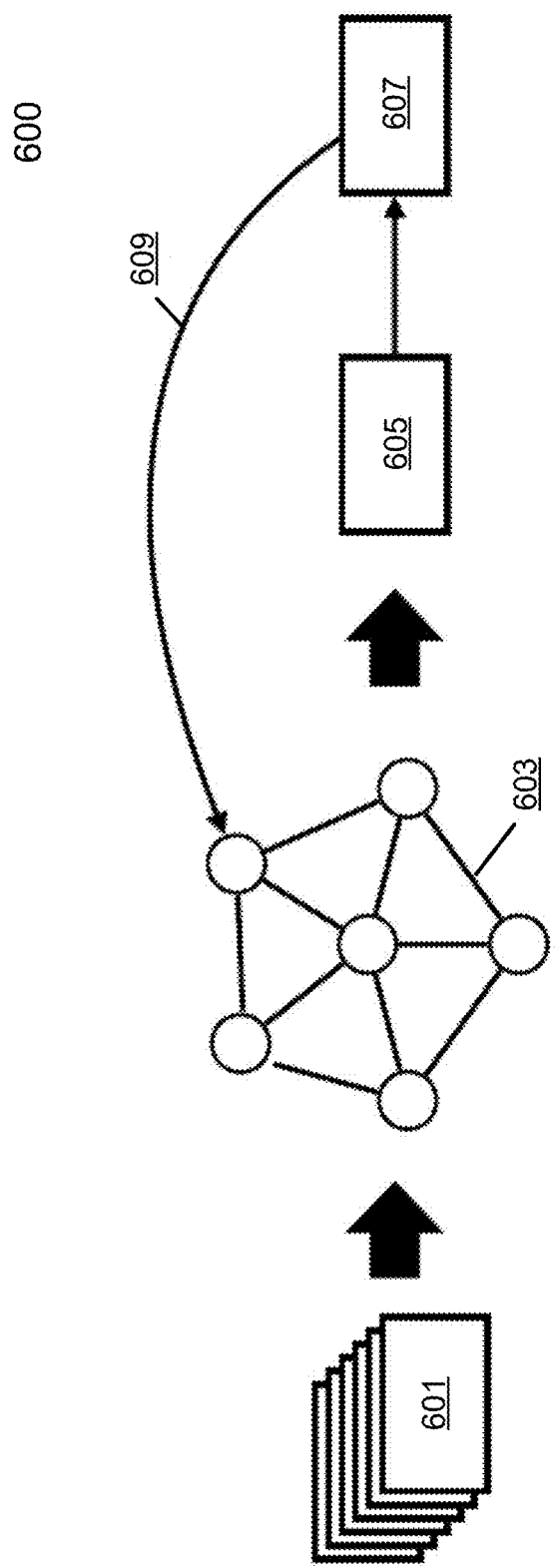
FIG. 6 is a block diagram illustrating an example one-level framework for hyperparameter optimization.

For the training level optimization, as shown in framework 600 of FIG. 6, a ML model 603 can be trained using a training dataset 601 for a given hyperparameter μ. An optimization algorithm $f_{opt}$, such as gradient descent, can be applied to training data (input X, output Y) of dataset 601 to find a local minimum. The model is forward propagated to generate outputs 605 and the outputs 605 are compared with ground truth from the training dataset to generate training losses 607. The training losses 607 are backpropagated 609 to update the weights/biases of the ML model and the process is repeated so to optimize a cost function, e.g., $\theta'=\theta-f_{opt}(X, Y, \theta, \mu)$, where θ denotes initial weights/biases of the ML model and θ' denotes updated weights/biases of the ML model.

Figure 7:
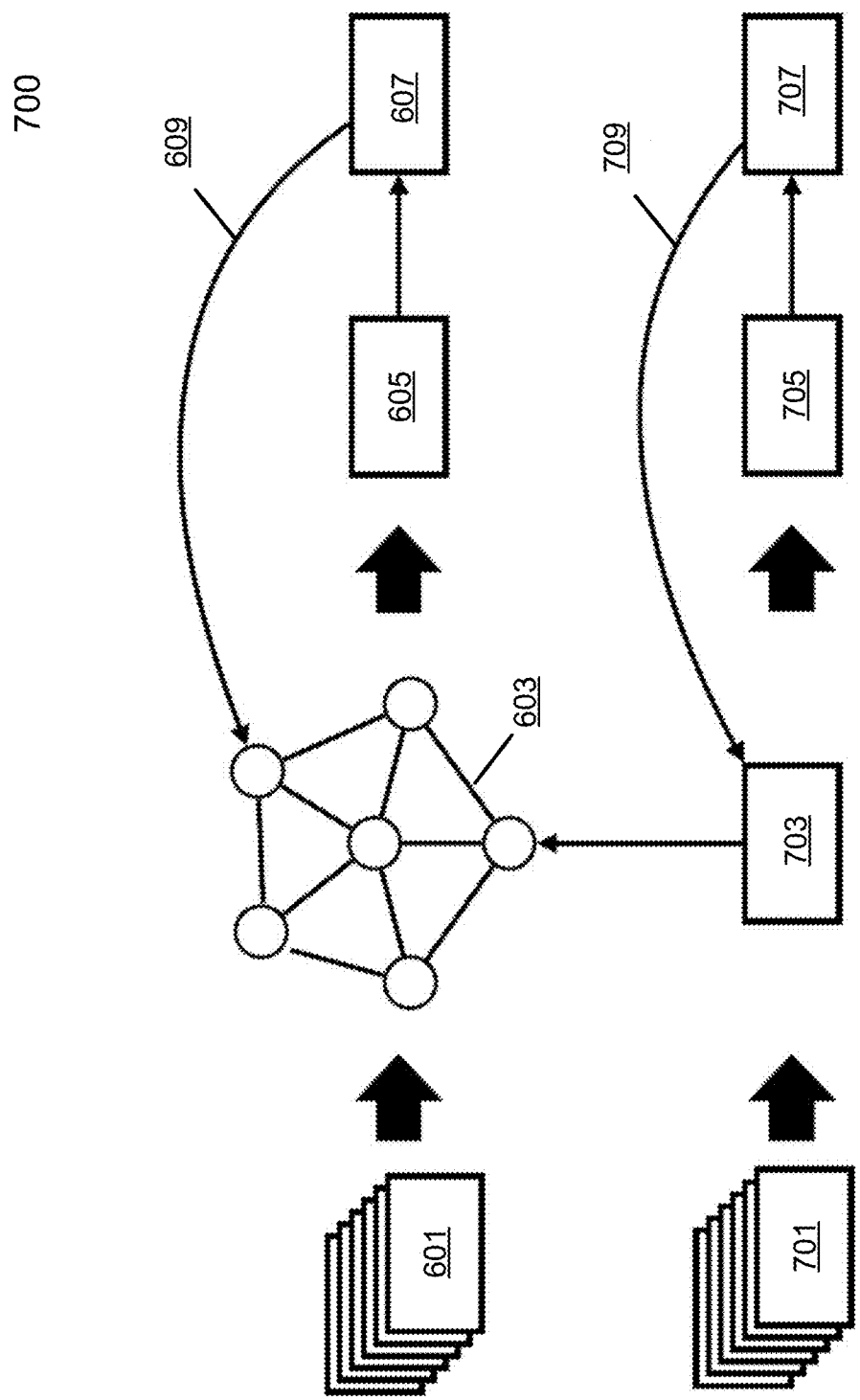
FIG. 7 is a block diagram illustrating an example two-levels framework for hyperparameter optimization.

For the validation level optimization, as shown in framework 700 of FIG. 7, ML model 603 can be validated using a validation dataset 701. The validation dataset refers to data that the ML model has yet seen. For example, ML model 603 can be applied to validation data to generate model outputs 705. The model outputs 705 are compared with ground truths from of the validation dataset 701 to generate validation losses 707. The validation losses (or prediction metric) 707 evaluates the accuracy of the ML model with respect to actual behavior predictions. For example, the validation losses can be a difference between the ground truth and the actual outputs from the ML model. The validation losses can be fed back 709 to a hyperparameter determiner 703 to determine a next hyperparameter. Through one or more iterations, an optimal hyperparameter is identified from minimizing prediction metrics according to formula:

$$\hat{u} = \arg\min_{u} \varepsilon_{pred}(\theta_*(u)),$$

wherein û is the optimal hyperparameter, $\varepsilon_{pred}$ is prediction metrics 707, and $\theta_*(u)$ is a trained ML model according to hyperparameter u.

In one embodiment, the behavior predictions for an obstacle can include an obstacle intention and a predicted trajectory for the obstacles. An obstacle intention can specify the intentions of the obstacles, such as, stay still, turn left, turn right, go straight, accelerate, decelerate, etc. The predicted trajectory for the obstacles can be a planning trajectory with path/speed information for the obstacles for a next predetermined number of planning cycles. The predicted trajectory can be applicable when the obstacle is a vehicle, a pedestrian, a bicycle, etc.

Figure 8:
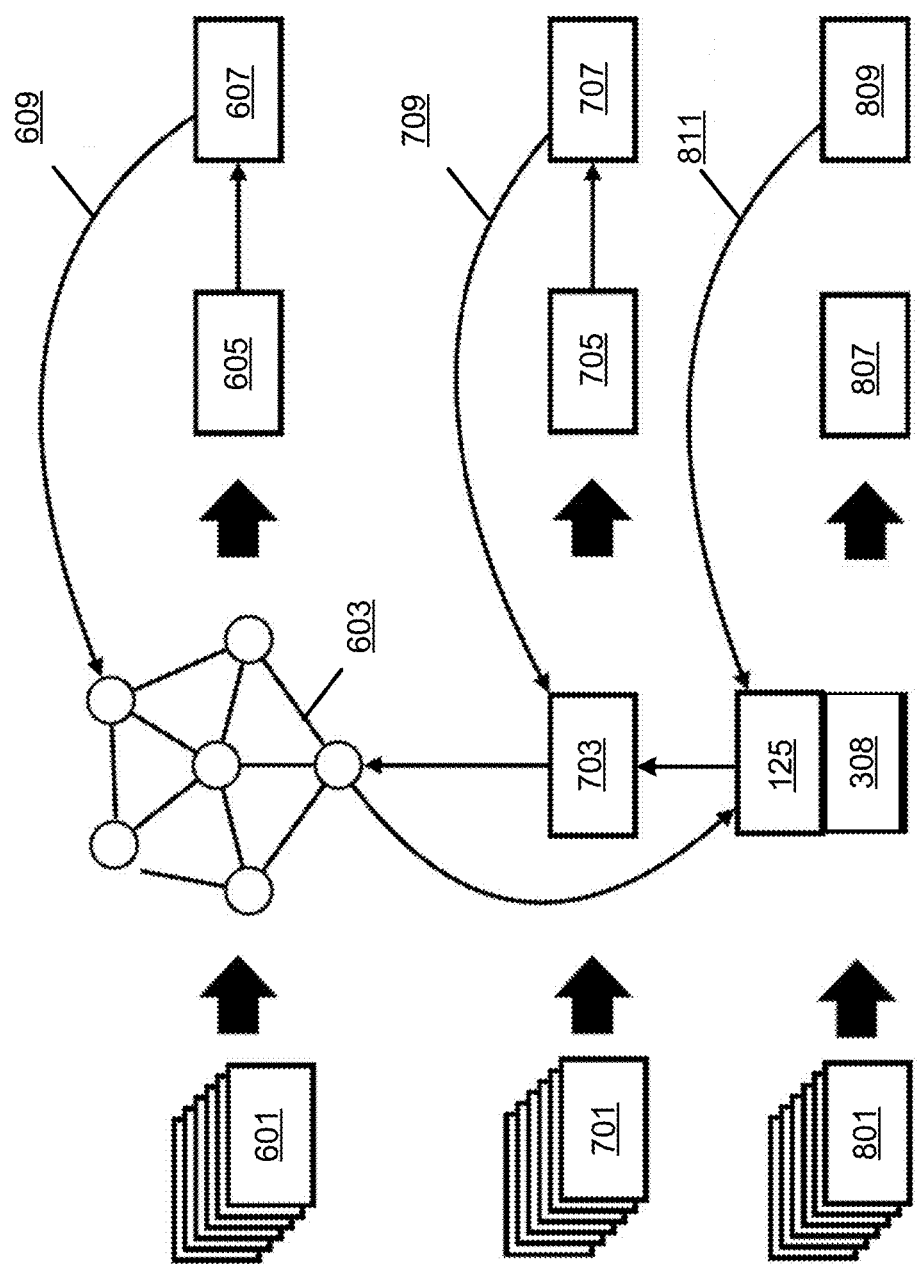
FIG. 8 is a block diagram illustrating an example three-levels framework for hyperparameter optimization according to one embodiment.

For the simulation level optimization, as shown in framework 800 of FIG. 8, ML model 603 can be uploaded to a simulator engine 125 that provides a simulation environment to simulate various driving scenarios 801 for a simulated ADV. Simulator engine 125 can be implemented by software and/or hardware where the simulator simulates a virtual ADV with obstacle prediction module 308 and other downstream modules (such as motion planning and control). Simulator can further simulate a driving environment to be closely related to what an ADV would see on the road. Then, ML model 603 is applied for obstacles prediction for various driving scenarios 801 to generate associated outputs 807. The outputs 807 can be used to generate simulation metrics 809, where the simulation metrics are fed back 811 to hyperparameter determiner 703 for the framework to determine a next hyperparameter. Through one or more iterations, an optimal hyperparameter is identified by minimizing prediction and/or simulation metrics according to formula:

$$\hat{u} = \arg\min_{u} \{\varepsilon_{sim}(\theta_*(u)), \varepsilon_{pred}(\theta_*(u))\},$$

where $\hat{u}$ is the optimal hyperparameter, $\varepsilon_{pred}$ denotes prediction metrics 707, $\varepsilon_{pred}$ denotes simulation metrics 809, and $\theta_*(u)$ is the trained ML model using hyperparameter u.

In one embodiment, the simulation metrics can include a quantity of hard brakes applied by the ADV over a predetermined distance (e.g., 1000 kilometers), a quantity of collisions caused by the ADV in the simulation over the predetermined distance. Such simulation metrics provide additional information to optimize the hyperparameter for the ML model.

Figure 9:
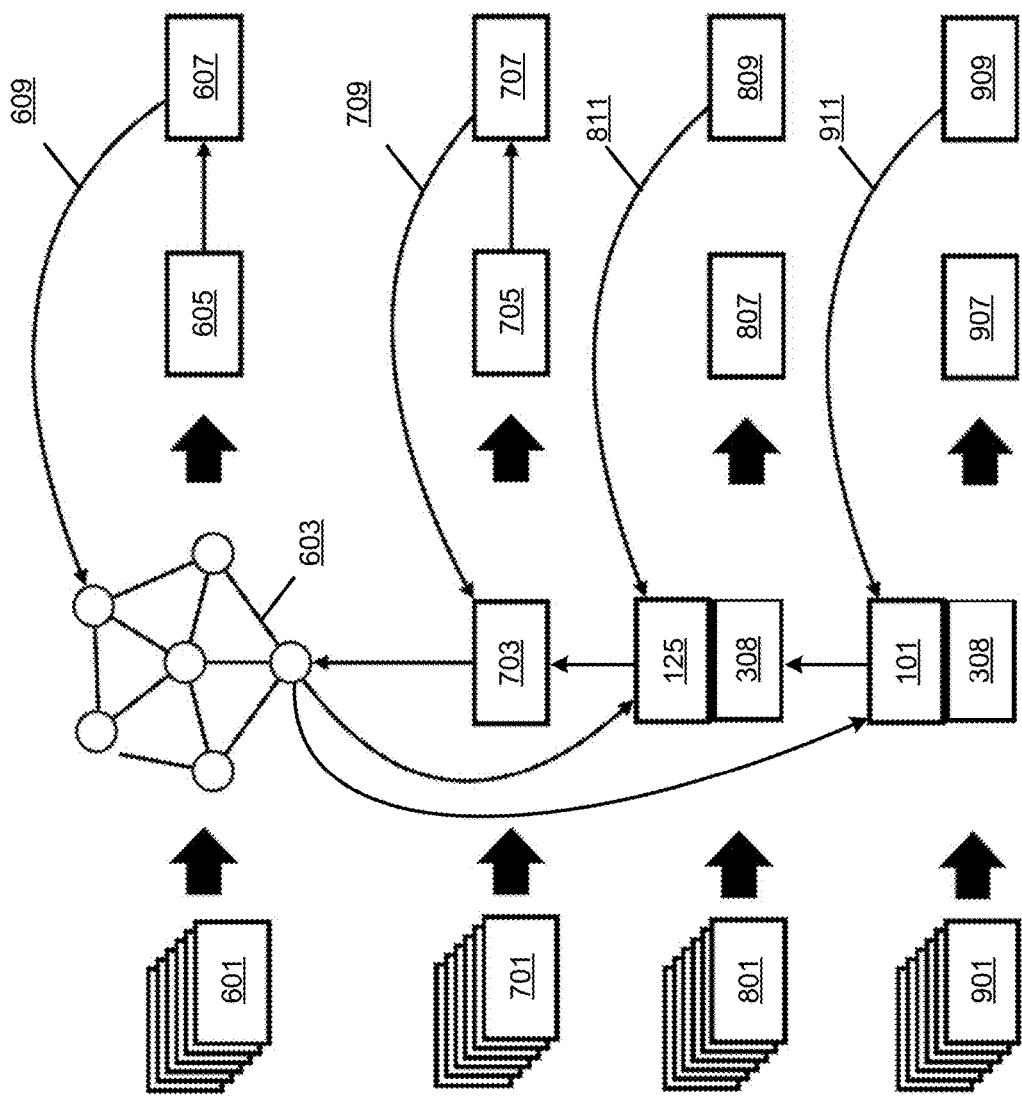
FIG. 9 is a block diagram illustrating an example four-levels framework for hyperparameter optimization according to one embodiment.

For the road-test level optimization, as shown in framework 900 of FIG. 9, ML model 603 can be uploaded to an obstacle prediction module 308 of an ADV 101 for road tests. Through various road test scenarios 901, ML model 603 can generate obstacle prediction outputs 907 and downstream modules of ADV 101 can perform planning and control for the ADV 101 using obstacle prediction outputs 907. Throughout road tests 901, ADV 101 can collect performance (e.g., road-test) metrics 909 for ML model 603. The road-test metrics can include a quantity of hard brakes applied by the ADV over a predetermined distance (e.g., 1000 kilometers), a quantity of collisions caused by the ADV over the predetermined distance, and/or a quantity of interventions by an operator of the ADV over the predetermined distance. The road-test metrics can be fed back 911 to hyperparameter determiner 703 to provide additional information to fine-tune the hyperparameter of ML model 603. Through one or more iterations, an optimal hyperparameter is identified by minimizing prediction and/or simulation metrics according to formula:

$$\hat{u} = \arg\min_{u} \{\varepsilon_{road}(\theta_*(u)), \varepsilon_{sim}(\theta_*(u)), \varepsilon_{pred}(\theta_*(u))\},$$

where $\hat{u}$ is the optimal hyperparameter, $\varepsilon_{pred}$ denotes prediction metrics 707, $\varepsilon_{pred}$ denotes simulation metrics 809, $\varepsilon_{road}$ denotes road-test metrics 907, and $\theta_*(u)$ is the trained ML model using hyperparameter u.

Note that, at the training level optimization, obstacle prediction ML model 603 is differentiable. But the other optimization levels incorporate downstream components (e.g., motion planning, decision, control, etc.) of the ADV and the optimization may not be differentiable. Moreover, simulating the simulation scenarios and subjecting variations of ML model 603 with different hyperparameters to simulation/road-tests requires additional time and resources. According to some embodiments, FIGS. 10-11 show ML models 1001, 1101 are used to estimate the performance (simulation and/or road-test) metrics for the obstacle prediction ML model 603 without subjecting the obstacle prediction ML model 603 to vigorous simulations and/or road-tests.

Figure 10:
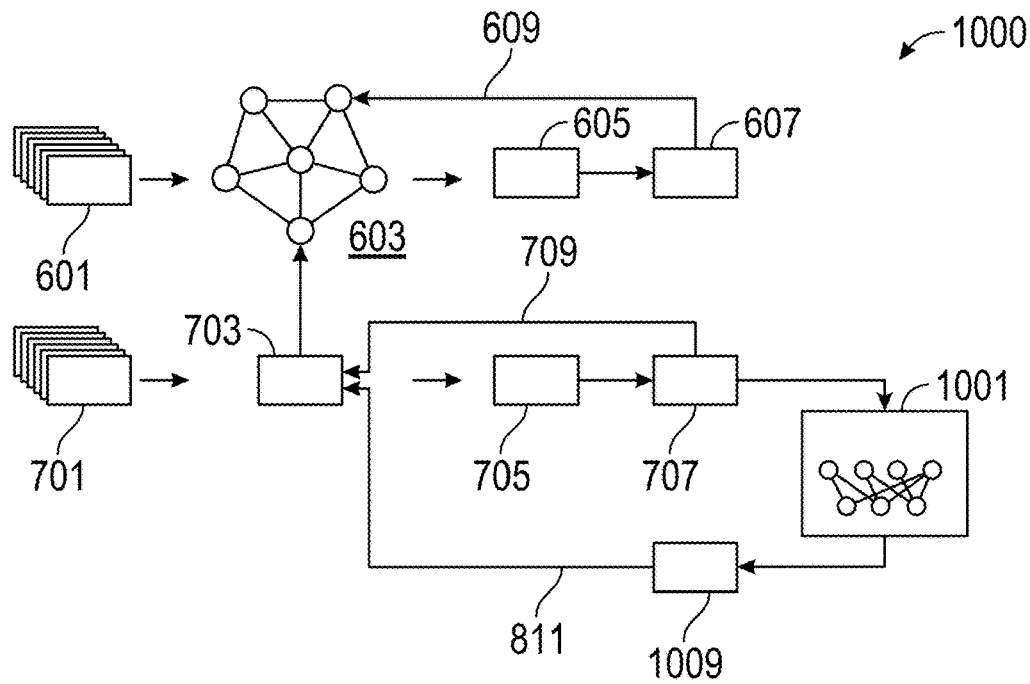
FIG. 10 is a block diagram illustrating an example framework with a ML model for simulation metrics estimations according to one embodiment.
Figure 11:
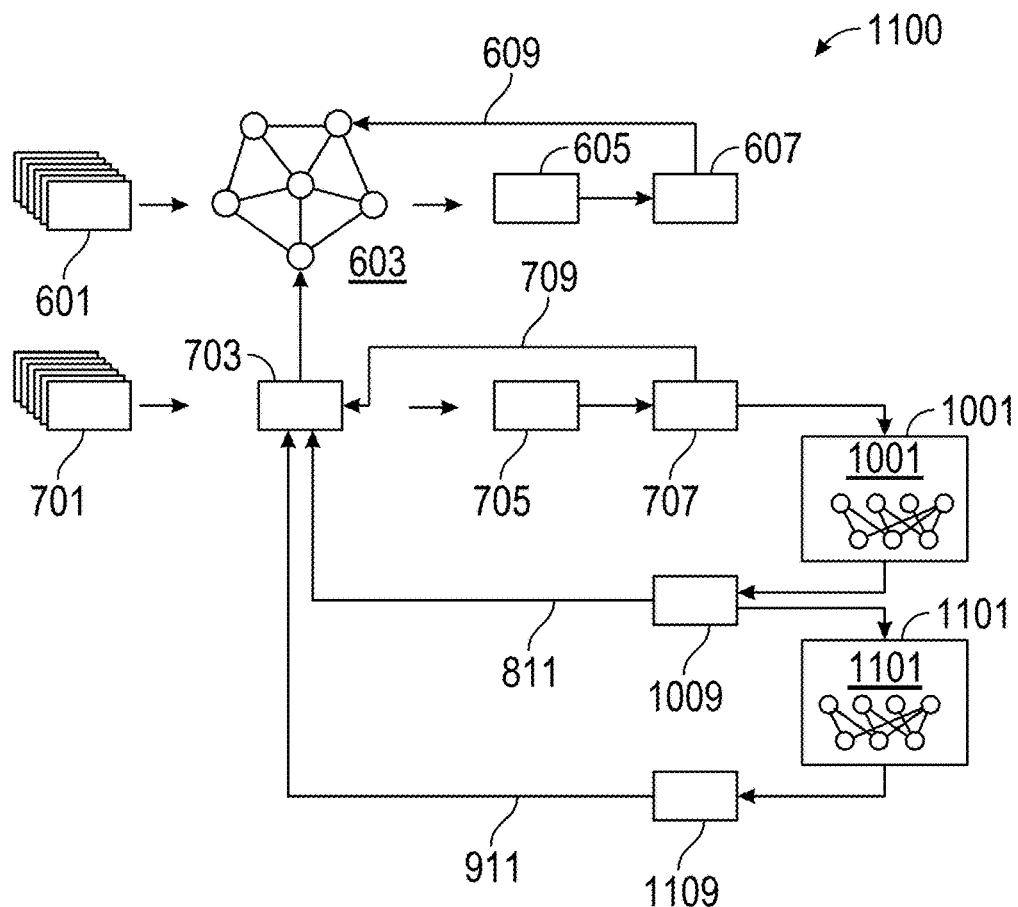
FIG. 11 is a block diagram illustrating an example framework with a ML model for road-test metrics estimations according to one embodiment.

FIG. 10 is a block diagram illustrating a ML model 1001 for simulation metrics estimations according to one embodiment. Framework 1000 can represent framework 800 of FIG. 8. As shown in FIG. 10, instead of subjecting the ML model 603 to a simulator 125, performance (e.g., simulation) metrics 1009 can be generated by applying a ML model 1001 to prediction metrics 707. Performance (e.g., simulation) metrics 1009 can estimate the performance (e.g., simulation) metrics 809 of framework 800. The estimated simulation metrics 1009 can be fed back to hyperparameter determiner 703 to identify hyperparameters that yield a best combination of simulation and/or prediction metric for object prediction ML model 603. In one embodiment, a best hyperparameter is identified using a weighted sums of the estimated simulation and/or prediction metrics. E.g., $$\hat{u} = \arg\min_{u} \{\varepsilon_{sim\_estimated}(\theta_*(u)), \varepsilon_{pred}(\theta_*(u))\},$$

where $\varepsilon_{sim\_estimated}$ denotes the estimated simulation metrics 1009 and $\varepsilon_{pred}$ denotes prediction metrics 707.

In one embodiment, ML model 1001 includes a linear regression model y=ax+b trained using supervised learning, where y is an output vector associated with output performance metric estimations, x is a matrix of input variables associated with the input prediction metrics, a and b are respective learning parameters trained using input/output metrics from stored simulation runs. For example, ML model 1001 is trained using previous stored vectors of prediction metrics (e.g., input) and vectors of simulation metrics (output) corresponding to stored simulation runs. In one embodiment, an algorithm such as a linear least-square algorithm can be applied to the input/output data to determine the a and b parameters.

In one embodiment, ML model 1001 includes a constrained linear regression model y=ax+b subject to lower<x, where lower=0 constraints x to be greater than 0. In one embodiment, the constrained linear regression model is optimized using quadratic programming. Quadratic programming refers to an optimize (minimize or maximize) approach to solve a multivariate quadratic function subject to linear constraints on the variables. In one embodiment, ML model 1001 further includes a decision tree, where the input metrics for ML model 1001 are further classified as one of a plurality of scenes (e.g., classes) to improve model inference results, as further shown in FIGS. 12A-12B.

FIG. 11 is a block diagram illustrating a ML model 1101 for road-test metrics estimations according to one embodiment. Framework 1100 can represent framework 900 of FIG. 9. As shown in FIG. 11, instead of subjecting the ML model 603 to real road tests, performance (e.g., road-test) metrics 1109 can be generated by applying a ML model 1101 to estimated simulation metrics 1009. Performance (e.g., road-test) metrics 1109 can estimate the actual performance (e.g., road-test) metrics 909 of framework 900. The estimated road-test metrics 1109 can be fed back to hyperparameter determiner 703 to identify hyperparameters that yield a best combination of road-test, simulation, and/or prediction metric for object prediction ML model 603. In one embodiment, a best hyperparameter is identified using a weighted sum of estimated road-test, estimated simulation, and/or prediction metrics. E.g., $$\hat{u} = \arg\min_{u} \{\varepsilon_{road\_estimated}(\theta_*(u)), \varepsilon_{sim\_estimated}(\theta_*(u)), \varepsilon_{pred}(\theta_*(u))\},$$

where $\varepsilon_{road\_estimated}$ denotes estimated road-test metrics 1109, $\varepsilon_{sim\_estimated}$ denotes the estimated simulation metrics 1009 and $\varepsilon_{pred}$ denotes prediction metrics 707.

In one embodiment, ML model 1101 includes a linear regression model y=ax+b trained using supervised learning, where y is an output vector associated with output metric estimations, x is a matrix of input variables associated with input metrics, a and b are respective learning parameters that are trained using input/output metrics from road-tests. For example, ML model 1101 is trained using previous stored vectors of simulation metrics (e.g., input) and vectors of road-test metrics (output) corresponding to previous road tests. In one embodiment, a training algorithm such as linear least-square algorithm can be applied to the input/output data to determine the a and b parameters.

In one embodiment, ML model 1101 includes a constrained linear regression model y=ax+b subject to 0<x. In one embodiment, the constrained linear regression model is optimized using quadratic programming. In one embodiment, ML model 1101 further includes a decision tree, where the input metrics for ML model 1101 are further classified as one of a plurality of classes to improve model inference results, as further shown in FIGS. 12A-12B.

Figure 12A:
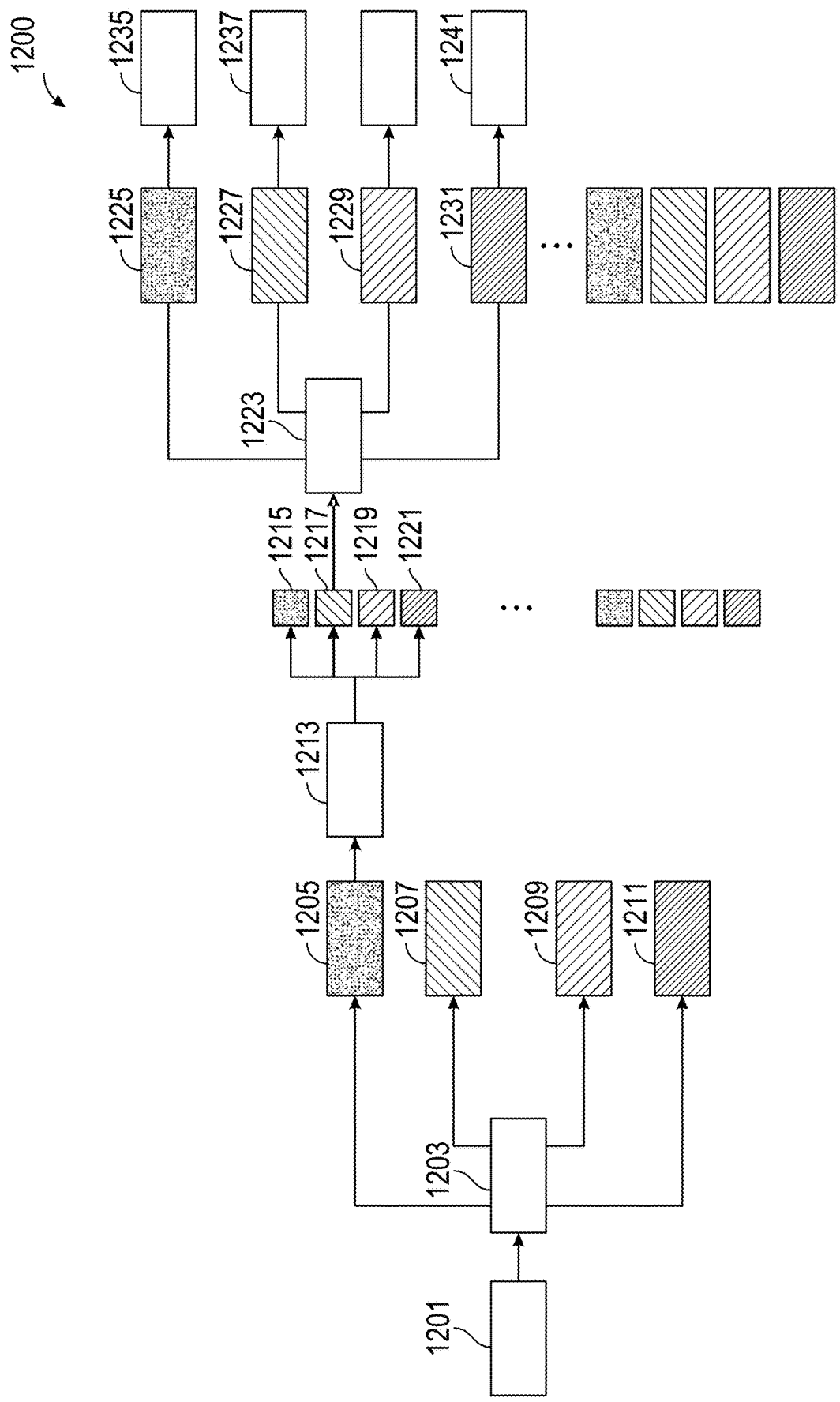
FIGS. 12A-12B are block diagrams illustrating a classification tree for scene classification for performance metrics generation according to one embodiment.
Figure 12B:
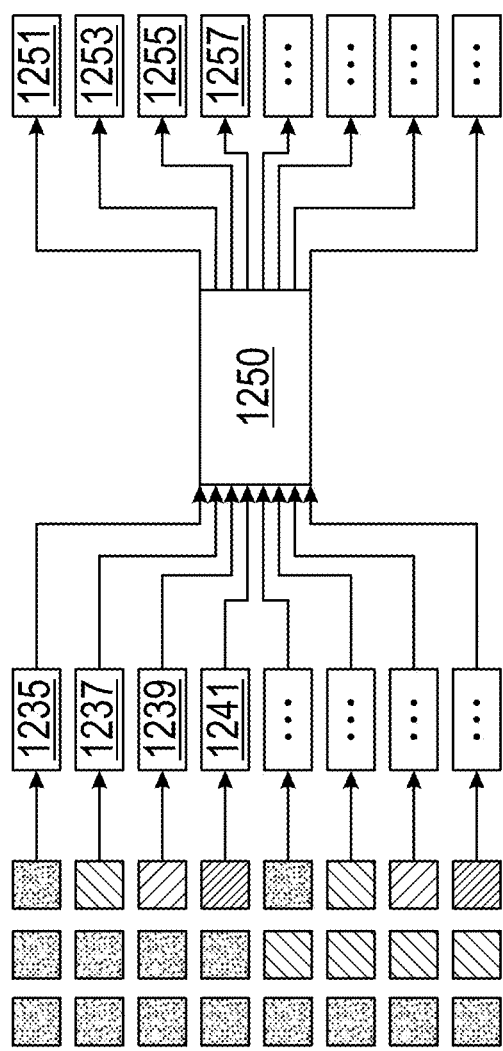

FIGS. 12A-12B are block diagrams illustrating a classification tree 1200 for performance metrics generation according to one embodiment. Model 1250 can include a hybrid linear model tree model. Model 1250 can represent models 1001 and/or 1101 of FIGS. 10-11. The hybrid linear model tree model can include a linear model tree combined with linear regression model to produce a more accurate predictions. For example, the linear model tree model can be a classification tree combined with linear models at its nodes. For the classification tree, the input metrics classification can be performed by processing logic which may include software, hardware, or a combination thereof. For example, the classification may be performed online by module 308 of FIG. 3A or performed offline, during training, by engine 122 of FIG. 1. In one embodiment, classification tree 1200 includes three levels of classification according to information for ADV status 1203, obstacle status 1213, and the obstacle type 1215.

Referring to FIG. 12A, classification tree 1200 determines, from driving simulations or road tests scenes, prediction metrics 1201. At block 1203, processing logic determines a status of the ADV for a driving scene. In one embodiment, the status of ADV can be categorized as one of: entering a roundabout 1205, exiting a roundabout 1207, yielding to an obstacle 1209, or others 1211. Next, at block 1213, processing logic determines a status for an obstacle. In one embodiment, the status of the obstacle can be categorized as one of: entering a roundabout 1215, exiting a roundabout 1217, yielding to an obstacle 1219, and others 1221. At block 1223, processing logic determines an obstacle type for the obstacle. In one embodiment, the obstacle types can be one of: vehicle 1225, bicycle 1227, pedestrian 1229, others 1231. From the three determinations, process logic categorizes prediction metrics 1201 as one of $4^3$=64 categories 1235-1241. In one embodiment, the classified metrics are recall performance metrics. Both precision and recall performance metrics can be applied to data retrieved from a collection, corpus or sample space. Recall performance metrics (also known as sensitivity) refer to a fraction of relevant data that were retrieved (e.g., true positives/relevant elements). FIG. 12B shows a ML model 1250 receives the recall performance metrics corresponding to the 64 scenes. ML model 1250 has a linear estimator for each of the 64 scenes and ML model 1250 applied to the input performance (prediction or simulation) metrics can generate output performance (simulation or road-test) metrics 1251-1257. ML model 1250 can represent ML model 1001 and/or 1101 of FIGS. 10-11. Note that although three levels of four subcategories for a total of 64 categories are illustrated, however, the classification tree can include any number of subcategories/categories.

Figure 13:
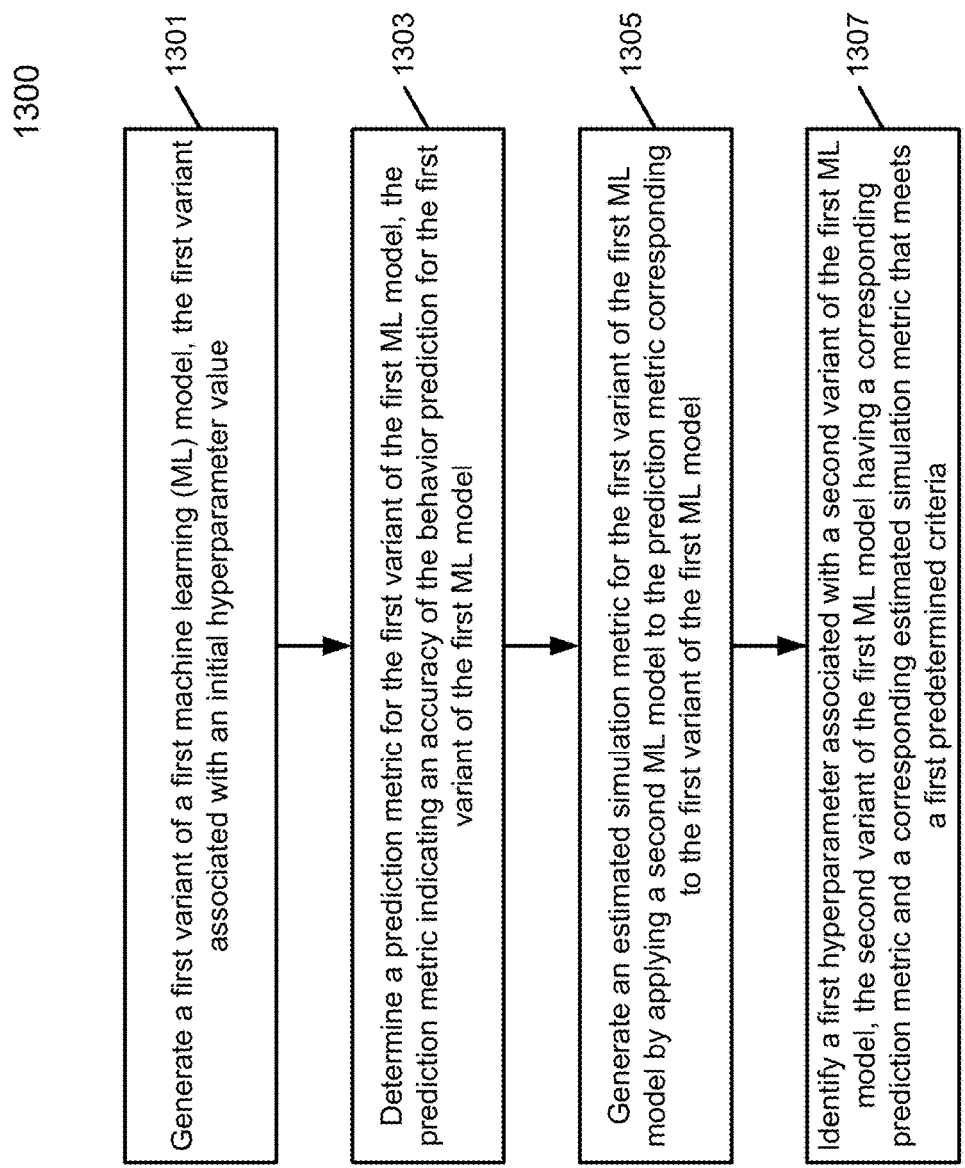
FIG. 13 is a flow diagram illustrating a process to generate a ML model for objection detection according to one embodiment.

FIG. 13 is a flow diagram illustrating a process to generate a ML model for objection detection according to one embodiment. Process 1300 may be performed by processing logic which may include software, hardware, or a combination thereof. For example, process 1300 may be performed by ML engine 122 of FIG. 4.

Referring to FIG. 13, at block 1301, processing logic generates a first variant of a first machine learning (ML) model (e.g., model 603 of FIG. 10), the first variant associated with an initial hyperparameter value.

At block 1303, processing logic determines a prediction metric (e.g., metric 707) for the first variant of the first ML model, the prediction metric indicating an accuracy of the behavior prediction for the first variant of the first ML model.

At block 1305, processing logic generates an estimated simulation metric (e.g., estimated metric 1009) for the first variant of the first ML model by applying a second ML model (e.g., ML model 1001) to the prediction metric corresponding to the first variant of the first ML model.

At block 1307, processing logic identifies a first hyperparameter, e.g., $$\hat{u} = \arg\min_{u} \{\varepsilon_{sim\_estimated}(\theta_*(u)), \varepsilon_{pred}(\theta_*(u))\},$$

associated with a second variant of the first ML model, the second variant of the first ML model having a corresponding prediction metric (metric 707) and a corresponding estimated simulation metric (metric 1009) that meet a first predetermined criteria, where the second variant of the first ML model is used by an autonomous driving vehicle (ADV) to predict a behavior of an obstacle.

In one embodiment, the second variant of the first ML model is used by an ADV to predict behaviors of one or more obstacles while the ADV is on a roadway.

In one embodiment, the prediction metric comprises at least one of: a distance similarity metric between a planning trajectory generated by the first variant of the first ML model and a ground truth trajectory from validation data and an intent classification between an intent classified by the first variant of the first ML model and a ground truth intent from validation data, wherein the planning trajectory and the intent classification correspond to the predicted behavior of the obstacle.

In one embodiment, the first predetermined criteria includes a smallest difference in a distance similarity metric between trajectories of validation data and prediction metrics or a smallest difference in an intent classification between the validation data and the prediction metrics.

In one embodiment, the estimated simulation metric corresponds to comfort and/or safety experienced by an operator of the ADV, where the estimated simulation metric includes: a quantity of hard brakes applied by the ADV in the simulated driving environment over a predetermined distance, and a quantity of collisions caused by the ADV in the simulated driving environment over the predetermined distance.

In one embodiment, the first predetermined criteria includes a lowest quantity of hard brakes applied by the ADV or a lowest quantity of collisions caused by the ADV for a predetermined distance.

In one embodiment, the first predetermined criteria includes a smallest weighted sum for: a difference in a distance similarity metric between trajectories of validation data and prediction metrics, a difference in an intent classification between the validation data and the prediction metrics, a quantity of hard brakes applied by the ADV for a predetermined distance, and a quantity of collisions caused by the ADV for the predetermined distance.

In one embodiment, the first ML model includes a deep neural network model and the second ML includes a constrained linear regression model.

In one embodiment, the constrained linear regression model is trained using quadratic programming constraining one or more parameters of the constrained linear regression model to be greater than zero.

Figure 14:
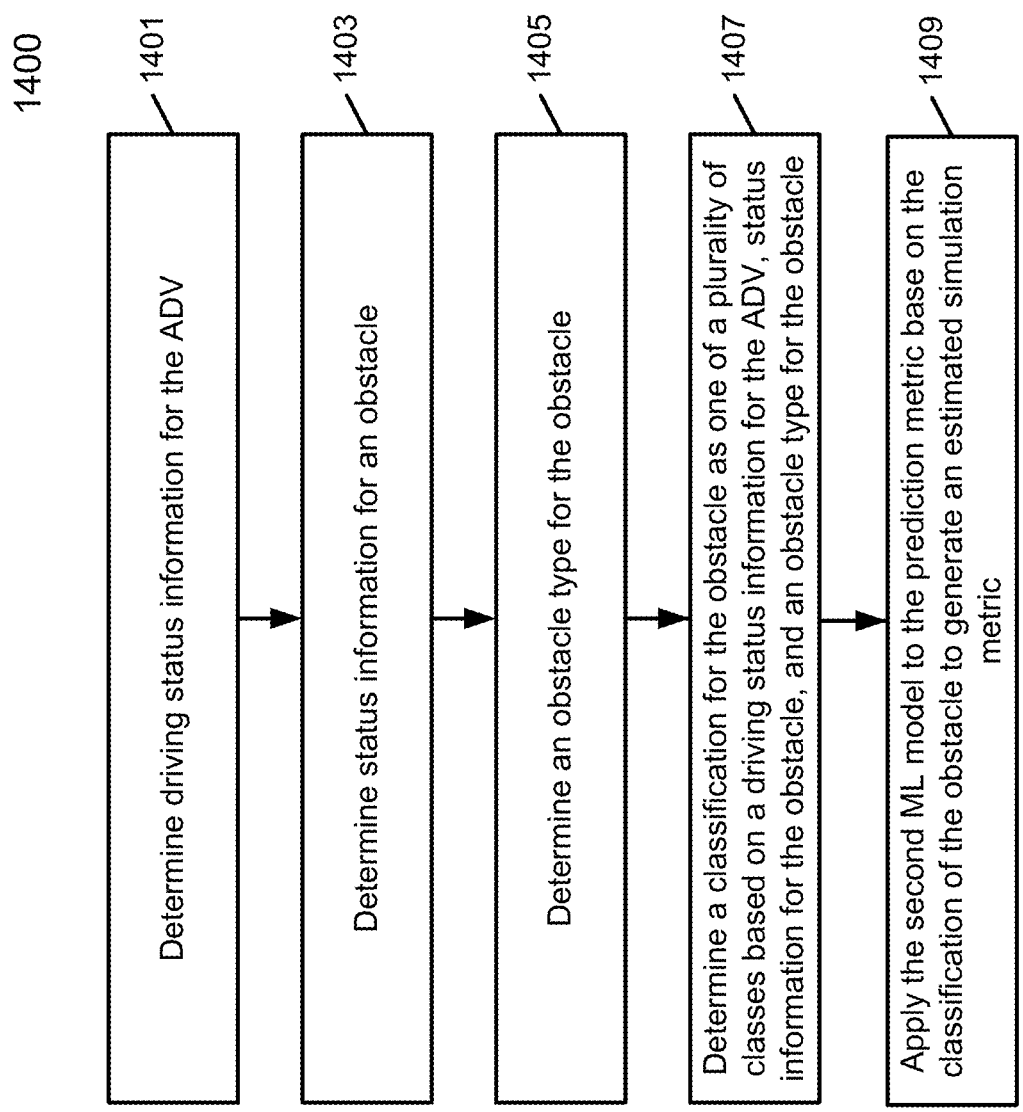
FIG. 14 is a flow diagram illustrating a process to generate estimated simulation metrics according to one embodiment.

FIG. 14 is a flow diagram illustrating a process to generate estimated simulation metrics according to one embodiment. Process 1400 may be performed by processing logic which may include software, hardware, or a combination thereof. For example, process 1400 may be performed by ML engine 122 of FIG. 4.

Referring to FIG. 14, at block 1401, processing logic determines driving status information for the ADV. At block 1403, processing logic determines status information for an obstacle. At block 1405, processing logic determines a classification (e.g., according to the classification tree 1200) for the obstacle as one of a plurality of classes based on the driving status information for the ADV, the status information for the obstacle, and the obstacle type for the obstacle. At block 1407, processing logic applies the second ML model (e.g., ML model 1001) to the prediction metric 707 based on the classification of the obstacle to generate the estimated simulation metric 1009.

In one embodiment, processing logic further generates an estimated road-test metric (e.g., metric 1109 of FIG. 11) for the first variant of the first ML model by applying a third ML model (e.g., ML model 1101) to the estimated simulation metric (e.g., metric 1009) corresponding to the first variant of the first ML model. Processing logic identifies a second hyperparameter, e.g., $$\hat{u} = \arg\min_{u} \{\varepsilon_{road\_estimated}(\theta_*(u)), \varepsilon_{sim\_estimated}(\theta_*(u)), \varepsilon_{pred}(\theta_*(u))\},$$

associated with a third variant of the first ML model, where the third variant of the first ML model has a corresponding prediction metric, a corresponding estimated simulation metric, and a corresponding estimated road-test metric that meet a second predetermined criteria.

In one embodiment, the estimated road-test metric corresponds to comfort and safety experienced by the ADV on a roadway and the estimated road-test metric includes: a quantity of hard brakes applied by the ADV on a roadway over a predetermined distance, or a quantity of collisions caused by the ADV on a roadway over the predetermined distance, or a quantity of intervention from an operator to disengage autonomous driving of the ADV on a roadway over the predetermined distance.

In one embodiment, the second predetermined criteria includes a smallest weighted sum for: a difference in a distance similarity metric between trajectories of validation data and prediction metrics, a difference in an intent classification between the validation data and the prediction metrics, a quantity of hard brakes applied by the ADV for a predetermined distance, a quantity of collisions caused by the ADV for the predetermined distance, and a quantity of intervention from an operator of the ADV over the predetermined distance.

Figure 15:
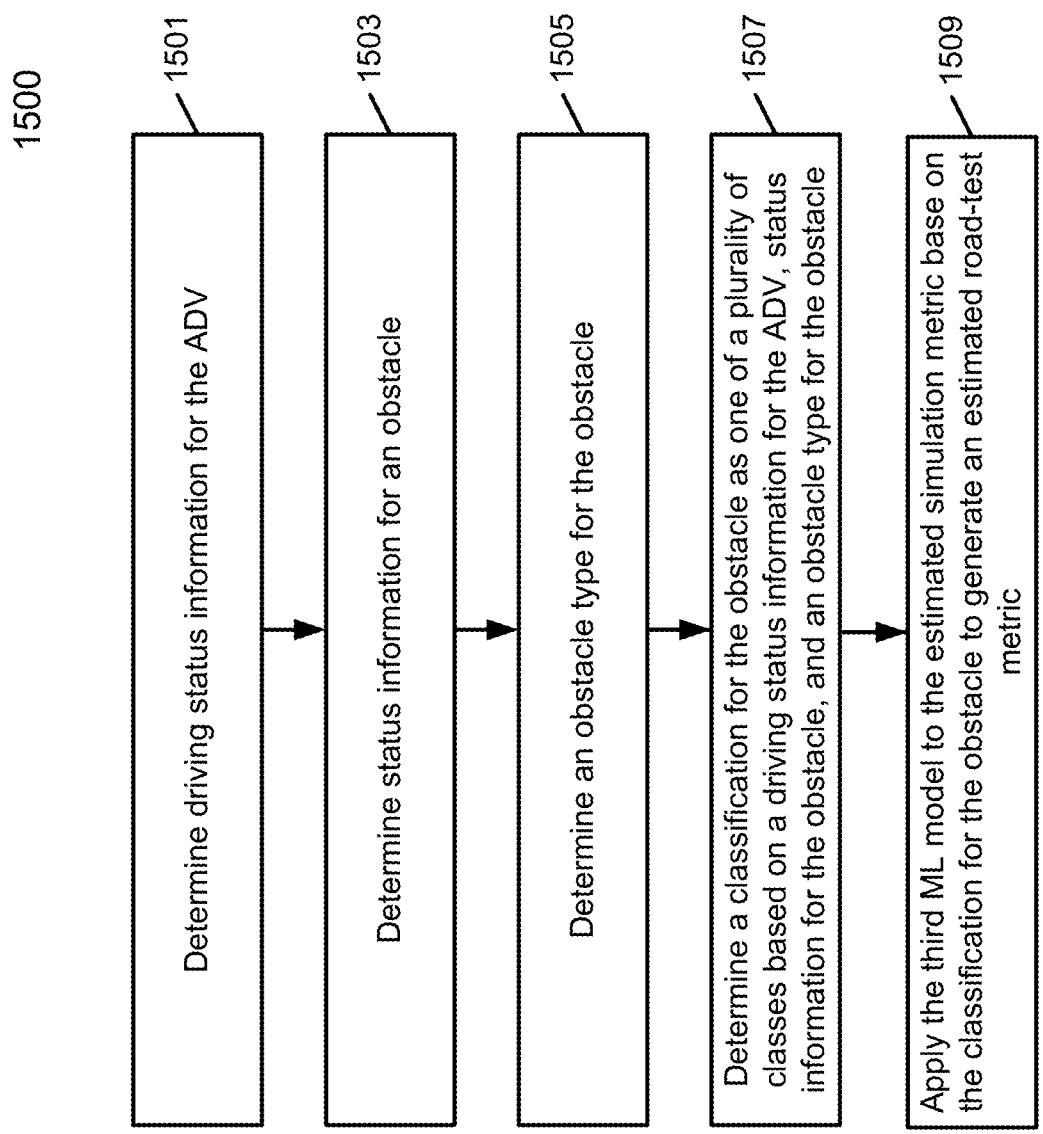
FIG. 15 is a flow diagram illustrating a process to generate estimated road-test metrics according to one embodiment.

FIG. 15 is a flow diagram illustrating a process to generate estimated road-test metrics according to one embodiment. Process 1500 may be performed by processing logic which may include software, hardware, or a combination thereof. For example, process 1500 may be performed by ML engine 122 of FIG. 4.

Referring to FIG. 15, at block 1501, processing logic determines driving status information for the ADV. At block 1503, processing logic determines status information for an obstacle. At block 1505, processing logic determines a classification (e.g., according to the classification tree 1200) for the obstacle as one of a plurality of classes based on the driving status information for the ADV, the status information for the obstacle, and the obstacle type for the obstacle. At block 1507, processing logic applies the third ML model (e.g., ML model 1101) to the estimated simulation metric 1009 based on the classification of the obstacle to generate the estimated road-test metric 1109.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
    generating a first variant of a first machine learning (ML) model, the first variant associated with an initial hyperparameter value;
    determining a prediction metric for the first variant of the first ML model, the prediction metric indicating an accuracy of a behavior prediction for the first variant of the first ML model;
    generating an estimated simulation metric for the first variant of the first ML model by applying a second ML model to the prediction metric corresponding to the first variant of the first ML model; and
    identifying a first hyperparameter associated with a second variant of the first ML model, the second variant of the first ML model having a corresponding prediction metric and a corresponding estimated simulation metric that meet a first predetermined criteria, wherein the second variant of the first ML model is used by an autonomous driving vehicle (ADV) to predict a behavior of an obstacle.

2. The method of claim 1, wherein the second variant of the first ML model is used by an ADV to predict behaviors of one or more obstacles while the ADV is on a roadway.

3. The method of claim 1, wherein the prediction metric comprises at least one of:
    a distance similarity metric between a planning trajectory generated by the first variant of the first ML model and a ground truth trajectory from validation data; and
    an intent classification between an intent classified by the first variant of the first ML model and a ground truth intent from validation data, wherein the planning trajectory and the intent classification correspond to the predicted behavior of the obstacle.

4. The method of claim 1, wherein the first predetermined criteria comprises a smallest difference in a distance similarity metric between trajectories of validation data and prediction metrics or a smallest difference in an intent classification between the validation data and the prediction metrics.

5. The method of claim 1, wherein the estimated simulation metric corresponds to comfort and/or safety experienced by an operator of the ADV, wherein the estimated simulation metric comprises:
    a quantity of hard brakes applied by the ADV in a simulated driving environment over a predetermined distance; or
    a quantity of collisions caused by the ADV in the simulated driving environment over the predetermined distance.

6. The method of claim 1, wherein the first predetermined criteria comprises a lowest quantity of hard brakes applied by the ADV or a lowest quantity of collisions caused by the ADV for a predetermined distance.

7. The method of claim 1, wherein the first predetermined criteria comprises a smallest weighted sum for: a difference in a distance similarity metric between trajectories of validation data and prediction metrics, a difference in an intent classification between the validation data and the prediction metrics, a quantity of hard brakes applied by the ADV for a predetermined distance, and a quantity of collisions caused by the ADV for the predetermined distance.

8. The method of claim 1, wherein the first ML model comprises a deep neural network model and the second ML model comprises a constrained linear regression model.

9. The method of claim 8, wherein the constrained linear regression model is trained using quadratic programming constraining one or more parameters of the constrained linear regression model to be greater than zero.

10. The method of claim 1, wherein generating the estimated simulation metric for the first variant of the first ML model by applying the second ML model to the prediction metric comprises:
    determining driving status information for the ADV;
    determining status information for an obstacle;
    determining an obstacle type for the obstacle;
    determining a classification for the obstacle as one of a plurality of classes based on the driving status information for the ADV, the status information for the obstacle, and the obstacle type for the obstacle; and
    applying the second ML model to the prediction metric based on the classification of the obstacle to generate the estimated simulation metric.

11. The method of claim 1, further comprising:
    generating an estimated road-test metric for the first variant of the first ML model by applying a third ML model to the estimated simulation metric corresponding to the first variant of the first ML model; and
    identifying a second hyperparameter associated with a third variant of the first ML model, wherein the third variant of the first ML model has the corresponding prediction metric, the corresponding estimated simulation metric, and a corresponding estimated road-test metric that meet a second predetermined criteria.

12. The method of claim 11, wherein the estimated road-test metric corresponds to comfort and safety experienced by the ADV on a roadway, wherein the estimated road-test metric comprises:

a quantity of hard brakes applied by the ADV on a roadway over a predetermined distance; or a quantity of collisions caused by the ADV on a roadway over the predetermined distance; or a quantity of intervention from an operator to disengage autonomous driving of the ADV on a roadway over the predetermined distance.

13. The method of claim 11, wherein the second predetermined criteria comprises a smallest weighted sum for: a difference in a distance similarity metric between trajectories of validation data and prediction metrics, a difference in an intent classification between the validation data and the prediction metrics, a quantity of hard brakes applied by the ADV for a predetermined distance, a quantity of collisions caused by the ADV for the predetermined distance, and a quantity of intervention from an operator of the ADV over the predetermined distance.

14. The method of claim 11, wherein generating the estimated road-test metric for the first variant of the first ML model by applying the third ML model to the estimated simulation metric comprises:

determining driving status information for the ADV;
determining status information for an obstacle;
determining an obstacle type for the obstacle;
determining a classification for the obstacle as one of a plurality of classes based on the driving status information for the ADV, the status information for the obstacle, and the obstacle type for the obstacle; and
applying the third ML model to the estimated simulation metric based on the classification of the obstacle to generate the estimated road-test metric.

15. A non-transitory machine-readable medium having instructions stored therein, which when executed by a processor, cause the processor to perform operations, the operations comprising:

generating a first variant of a first machine learning (ML) model, the first variant associated with an initial hyperparameter value;
determining a prediction metric for the first variant of the first ML model, the prediction metric indicating an accuracy of a behavior prediction for the first variant of the first ML model;
generating an estimated simulation metric for the first variant of the first ML model by applying a second ML model to the prediction metric corresponding to the first variant of the first ML model; and
identifying a first hyperparameter associated with a second variant of the first ML model, the second variant of the first ML model having a corresponding prediction metric and a corresponding estimated simulation metric that meet a first predetermined criteria, wherein the second variant of the first ML model is used by an autonomous driving vehicle (ADV) to predict a behavior of an obstacle.

16. The non-transitory machine-readable medium of claim 15, wherein the second variant of the first ML model is used by an ADV to predict behaviors of one or more obstacles while the ADV is on a roadway.

17. The non-transitory machine-readable medium of claim 15, wherein the prediction metric comprises at least one of:

a distance similarity metric between a planning trajectory generated by the first variant of the first ML model and a ground truth trajectory from validation data; and
an intent classification between an intent classified by the first variant of the first ML model and a ground truth intent from validation data, wherein the planning trajectory and the intent classification correspond to the predicted behavior of the obstacle.

18. The non-transitory machine-readable medium of claim 15, wherein the first predetermined criteria comprises a smallest difference in a distance similarity metric between trajectories of validation data and prediction metrics or a smallest difference in an intent classification between the validation data and the prediction metrics.

19. A data processing system, comprising:

a processor; and
a memory coupled to the processor to store instructions, which when executed by the processor, cause the processor to perform operations, the operations including:
generating a first variant of a first machine learning (ML) model, the first variant associated with an initial hyperparameter value;
determining a prediction metric for the first variant of the first ML model, the prediction metric indicating an accuracy of a behavior prediction for the first variant of the first ML model;
generating an estimated simulation metric for the first variant of the first ML model by applying a second ML model to the prediction metric corresponding to the first variant of the first ML model; and
identifying a first hyperparameter associated with a second variant of the first ML model, the second variant of the first ML model having a corresponding prediction metric and a corresponding estimated simulation metric that meet a first predetermined criteria, wherein the second variant of the first ML model is used by an autonomous driving vehicle (ADV) to predict a behavior of an obstacle.

20. The system of claim 19, wherein the second variant of the first ML model is used by an ADV to predict behaviors of one or more obstacles while the ADV is on a roadway.

* * * * *